United States Patent
Jiang et al.

(10) Patent No.: US 10,178,673 B1
(45) Date of Patent: Jan. 8, 2019

(54) SOUNDING FOR UL OFDMA TRANSMISSION IN WLAN

(71) Applicant: Marvell International Ltd., Hamilton (BM)

(72) Inventors: Jinjing Jiang, San Jose, CA (US); Liwen Chu, San Ramon, CA (US); Yakun Sun, San Jose, CA (US); Lei Wang, San Diego, CA (US); Hongyuan Zhang, Fremont, CA (US)

(73) Assignee: MARVELL INTERNATIONAL LTD., Hamilton (BM)

(*) Notice: Subject to any disclaimer, the term of this patent is extended or adjusted under 35 U.S.C. 154(b) by 23 days.

(21) Appl. No.: 15/379,274

(22) Filed: Dec. 14, 2016

Related U.S. Application Data

(60) Provisional application No. 62/268,069, filed on Dec. 16, 2015.

(51) Int. Cl.
| | |
|---|---|
| H04W 72/04 | (2009.01) |
| H04W 72/08 | (2009.01) |
| H04L 27/26 | (2006.01) |
| H04W 84/12 | (2009.01) |

(52) U.S. Cl.
CPC ..... *H04W 72/0453* (2013.01); *H04L 27/2608* (2013.01); *H04L 27/2613* (2013.01); *H04W 72/042* (2013.01); *H04W 72/0413* (2013.01); *H04W 72/085* (2013.01); *H04W 84/12* (2013.01)

(58) Field of Classification Search
CPC ......... H04W 72/0453; H04W 72/0413; H04W 72/042; H04W 72/085; H04W 84/12; H04L 27/2613; H04L 27/2608

USPC ................................ 370/329, 328, 342, 252
See application file for complete search history.

(56) References Cited

U.S. PATENT DOCUMENTS

| | | | | |
|---|---|---|---|---|
| 2010/0260060 | A1* | 10/2010 | Abraham | H04L 25/03343 370/252 |
| 2011/0243262 | A1* | 10/2011 | Ratasuk | H04L 5/003 375/260 |
| 2011/0261806 | A1* | 10/2011 | Chun | H04L 5/0016 370/342 |
| 2013/0301569 | A1* | 11/2013 | Wang | H04L 5/0055 370/329 |
| 2016/0094318 | A1* | 3/2016 | Shattil | H04B 7/026 375/267 |
| 2017/0264354 | A1* | 9/2017 | Ghosh | H04B 7/0452 |

* cited by examiner

*Primary Examiner* — Candal Elpenord
*Assistant Examiner* — Syed M Bokhari

(57) ABSTRACT

Systems and techniques relating to wireless communications are described. A described technique includes transmitting a signal to cause wireless devices to concurrently transmit sounding packets on different subcarriers within a frequency band during a multi-user uplink transmission; receiving, concurrently, sounding packets from the wireless devices on the different subcarriers within the frequency band during the multi-user uplink transmission; determining subcarrier channel qualities based on the sounding packets; and assigning the subcarriers among the wireless devices for a subsequent multi-user uplink transmission based on the subcarrier channel qualities.

12 Claims, 8 Drawing Sheets

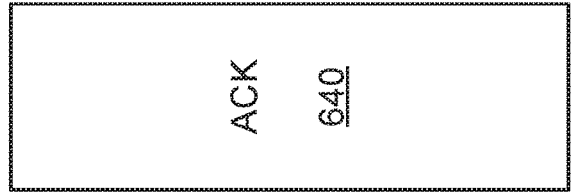
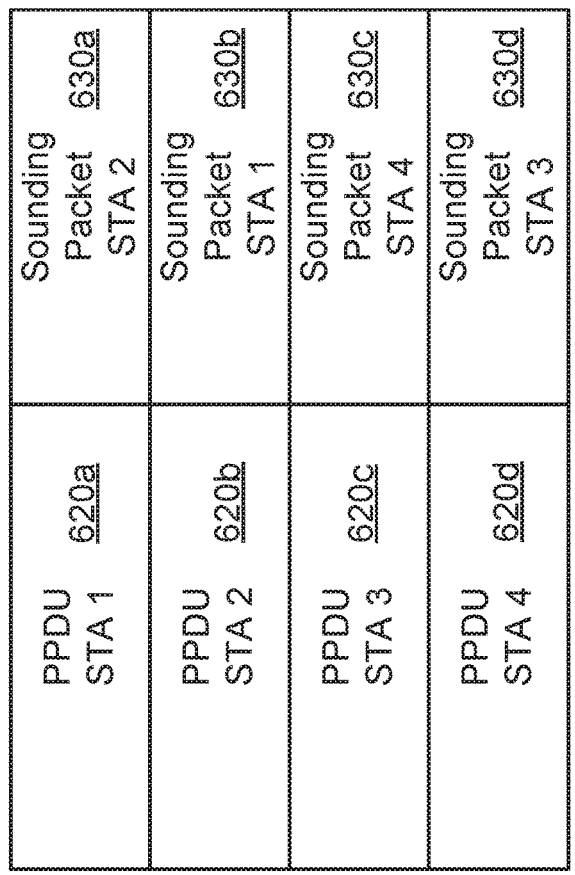
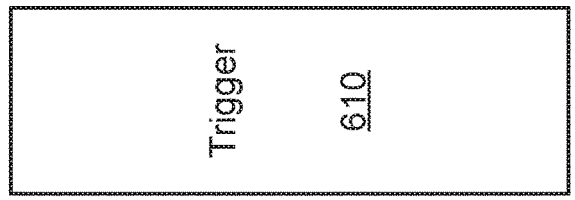
Fig. 6

SOUNDING FOR UL OFDMA TRANSMISSION IN WLAN

CROSS REFERENCE TO RELATED APPLICATIONS

This present disclosure claims the benefit of the priority of U.S. Provisional Application Ser. No. 62/268,069, filed Dec. 16, 2015, and entitled "SOUNDING FOR UL OFDMA TRANSMISSION IN WLAN," which is incorporated herein by reference in its entirety.

BACKGROUND

This disclosure relates to wireless communication systems, including Wireless Local Area Networks (WLANs).

Wireless communication systems can include multiple wireless communication devices that communicate over one or more wireless channels. When operating in an infrastructure mode, a wireless communication device called an access point (AP) provides connectivity with a network, such as the Internet, to other wireless communication devices, which can be referred to as client stations (STAs), client devices, clients, access terminals (ATs). Various examples of wireless communication devices include mobile phones, smart phones, wireless routers, and wireless hubs. In some cases, wireless communication electronics are integrated with data processing equipment such as laptops, personal digital assistants, and computers.

Wireless communication systems, such as WLANs, can use one or more wireless communication technologies, such as Orthogonal Frequency Division Multiplexing (OFDM) for the physical (PHY) layer. In an OFDM based wireless communication system, a data stream is split into multiple data substreams. Such data substreams are sent over different OFDM subcarriers, which are commonly also referred to as tones or frequency tones. WLANs such as those defined in the Institute of Electrical and Electronics Engineers (IEEE) wireless communications standards, e.g., IEEE 802.11a, IEEE 802.11n, IEEE 802.11ac, and IEEE 802.11ax can use OFDM to transmit and receive signals. Some wireless communication systems can use Orthogonal Frequency-Division Multiple Access (OFDMA) to enable different devices to communicate on different subsets of subcarriers at the same time.

Wireless communication devices in a WLAN can use one or more protocols for a medium access control (MAC) layer and a physical (PHY) layer. For example, a wireless communication device can use a Carrier Sense Multiple Access (CSMA) with Collision Avoidance (CA) based protocol for a MAC layer and OFDM for the PHY layer. The MAC layer can communicate with a Physical Layer Convergence Protocol (PLCP) sublayer. After receiving a MAC protocol data unit (MPDU) from the MAC layer, the PLCP sublayer can include PHY specific preamble fields to form a PLCP protocol data unit (PPDU) for transmission. A MPDU can also be called a PLCP service data unit (PSDU).

SUMMARY

The present disclosure includes systems and techniques for wireless communications. According to an aspect of the present disclosure, a technique for wireless communications includes transmitting a signal to cause wireless devices to concurrently transmit sounding packets on different subcarriers within a frequency band during a multi-user uplink transmission; receiving, concurrently, sounding packets from the wireless devices on the different subcarriers within the frequency band during the multi-user uplink transmission; determining subcarrier channel qualities based on the sounding packets; and assigning the subcarriers among the wireless devices for a subsequent multi-user uplink transmission based on the subcarrier channel qualities.

This and other implementations can include one or more of the following features. Transmitting the signal can include transmitting a trigger frame to cause the wireless devices to respectively transmit protocol data units before the sounding packets. In some implementations, the multi-user uplink transmission includes the protocol data units and the sounding packets. Implementations can include assigning, under a first mapping, the subcarriers to the wireless devices for transmission of the protocol data units; and assigning, under a second mapping, the subcarriers to the wireless devices for transmission of the sounding packets, wherein the first mapping and the second mapping alternate subcarrier to device assignments. Implementations can include receiving the protocol data units; and determining second subcarrier channel qualities based on the protocol data units. Assigning the subcarriers can include: using the subcarrier channel qualities that are determined based on the protocol data units and the subcarrier channel qualities that are determined based on the sounding packets to determine whether a subcarrier assignment under the first mapping for a wireless device of the wireless devices is better or worse than a subcarrier assignment under the second mapping for the wireless device. In some implementations, one or more short training fields are transmitted between the protocol data units and the sounding packets, and the sounding packets include long training fields.

In some implementations, transmitting the signal includes transmitting a null data packet announcement frame. In some implementations, the multi-user uplink transmission includes a multi-user uplink sounding transmission. Implementations can include assigning a first group of the subcarriers to a first wireless device of the wireless devices; and assigning a second group of the subcarriers to a second wireless device of the wireless devices. Transmitting the signal can include transmitting subcarrier assignment information about the first group of the subcarriers and the second group of the subcarriers. In some implementations, the first group of the subcarriers is interleaved with the second group of the subcarriers across the frequency band. In some implementations, the first group of the subcarriers is continuous within the frequency band, and the second group of the subcarriers is continuous within the frequency band.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

According to another aspect of the present disclosure, an apparatus can include circuitry such as a transceiver configured to transmit a signal to cause wireless devices to concurrently transmit sounding packets on different subcarriers within a frequency band during a multi-user uplink transmission and to receive, concurrently, sounding packets from the wireless devices on the different subcarriers within the frequency band during the multi-user uplink transmission; and a processor coupled with the transceiver. In some implementations, the processor is configured to determine subcarrier channel qualities based on the sounding packets and assign the subcarriers among the wireless devices for a subsequent multi-user uplink transmission based on the subcarrier channel qualities.

In some implementations, the signal includes a trigger frame to cause the wireless devices to respectively transmit protocol data units before the sounding packets, and the multi-user uplink transmission includes the protocol data units and the sounding packets. In some implementations, the processor is configured to assign, under a first mapping, the subcarriers to the wireless devices for transmission of the protocol data units, and assign, under a second mapping, the subcarriers to the wireless devices for transmission of the sounding packets, the first mapping and the second mapping alternate subcarrier to device assignments. In some implementations, the processor is configured to determine second subcarrier channel qualities based on the protocol data units. In some implementations, the processor is configured to assign the subcarriers by using the subcarrier channel qualities that are determined based on the protocol data units and the subcarrier channel qualities that are determined based on the sounding packets to determine whether a subcarrier assignment under the first mapping for a wireless device of the wireless devices is better or worse than a subcarrier assignment under the second mapping for the wireless device. In some implementations, one or more short training fields are transmitted between the protocol data units and the sounding packets, and the sounding packets include long training fields. In some implementations, the signal includes a null data packet announcement frame, and the multi-user uplink transmission includes a multi-user uplink sounding transmission.

In some implementations, the processor is configured to assign a first group of the subcarriers to a first wireless device of the wireless devices, and assign a second group of the subcarriers to a second wireless device of the wireless devices; the signal includes subcarrier assignment information about the first group of the subcarriers and the second group of the subcarriers. In some implementations, the first group of the subcarriers is interleaved with the second group of the subcarriers across the frequency band. In some implementations, the first group of the subcarriers is continuous within the frequency band, and the second group of the subcarriers is continuous within the frequency band. In some implementations, the processor and at least a portion of the transceiver are integrated within a system-on-a-chip (SOC).

According to another aspect of the present disclosure, an apparatus can include a transceiver configured to receive, from a wireless device, a protocol data unit, such as a PPDU, on different subcarriers within a frequency band during a single-user uplink transmission and to receive a sounding packet from the wireless device on the different subcarriers within the frequency band during the single-user uplink transmission, the wireless device being configured to piggyback the sounding packet to the protocol data unit without a sounding solicitation; and a processor coupled with the transceiver. In some implementations, the processor is configured to determine subcarrier channel qualities based on the sounding packet and assign one or more of the subcarriers to the wireless device for a subsequent uplink transmission based on the subcarrier channel qualities. In some implementations, one or more short training fields are transmitted between the protocol data unit and the sounding packet. In some implementations, the sounding packet includes one or more long training fields.

Particular configurations of the technology described in this disclosure can be implemented so as to realize one or more of the following potential advantages. A described multi-user sounding technology can make channel sounding faster and reduce signaling overhead. Since channel sounding results become stale with time, enabling multiple user devices to perform sounding concurrently can lead to faster and better resource unit assignments for the group of user devices such that the uplink multi-user transmission takes place while the channel sounding results are still relevant.

Details of one or more implementations are set forth in the accompanying drawings and the description below. Other features and advantages may be apparent from the description and drawings, and from the claims.

DRAWING DESCRIPTIONS

FIG. 6 shows a multi-user communication sequence among wireless devices that includes sounding packets piggybacking on protocol data units.

Like reference symbols in the various drawings indicate like elements.

DETAILED DESCRIPTION

In IEEE 802.11ax, uplink (UL) OFDMA is a feature designed to improve WLAN efficiency. A wireless device such as an AP can schedule, through a downlink trigger frame, multiple client wireless devices to send uplink frames simultaneously on different resource units (RUs). A RU can include one or more OFDM subcarriers. To realize the full potential of the performance gain associated with UL OFDMA, the AP can determine the channel quality for each client wireless device to make better RU assignments.

Typically, an AP has a set of to-be-scheduled client wireless devices (e.g., stations or STAs). In some implementations, the set includes all or a subset of devices registered with the AP; note that one or more devices may have a significant backlog as indicated by their buffer report to the AP. In some implementations, an AP is not required to sample every possible RU for each device due to the partial information about UL OFDMA scheduling. For example, the AP may have one or more previous sounding results, which may still be valid. In some implementations, the AP may prefer to select a certain RU for a device, for example, only the beginning one or more 26-tone continuous RUs of a frequency band are desired for this device.

In single-user (SU) sounding in a group device setting, an AP transmits a trigger frame such as a null data packet announcement (NDPA) to a first device and receives a sounding packet such as a Null Data Packet (NDP) from the first device. Next, the AP transmits another trigger frame to a second device and receives a sounding packet from the second device. A NDP can be transmitted in the same bandwidth as the trigger frame such that the AP can measure the quality of all the possible RUs that could be assigned to each device. The AP determines and assigns RUs based on the sounding feedback. The AP sends another trigger frame to start an UL OFDMA transmission, during which the devices concurrently transmit data based on respectively assigned RUs. While this SU sounding approach is simple, there is a relatively large overhead (e.g., delay due to the sequential, device-by-device nature of SU sounding), and the sounding information may become outdated by the time the post-sounding UL OFDMA transmission occurs.

Figure 1:
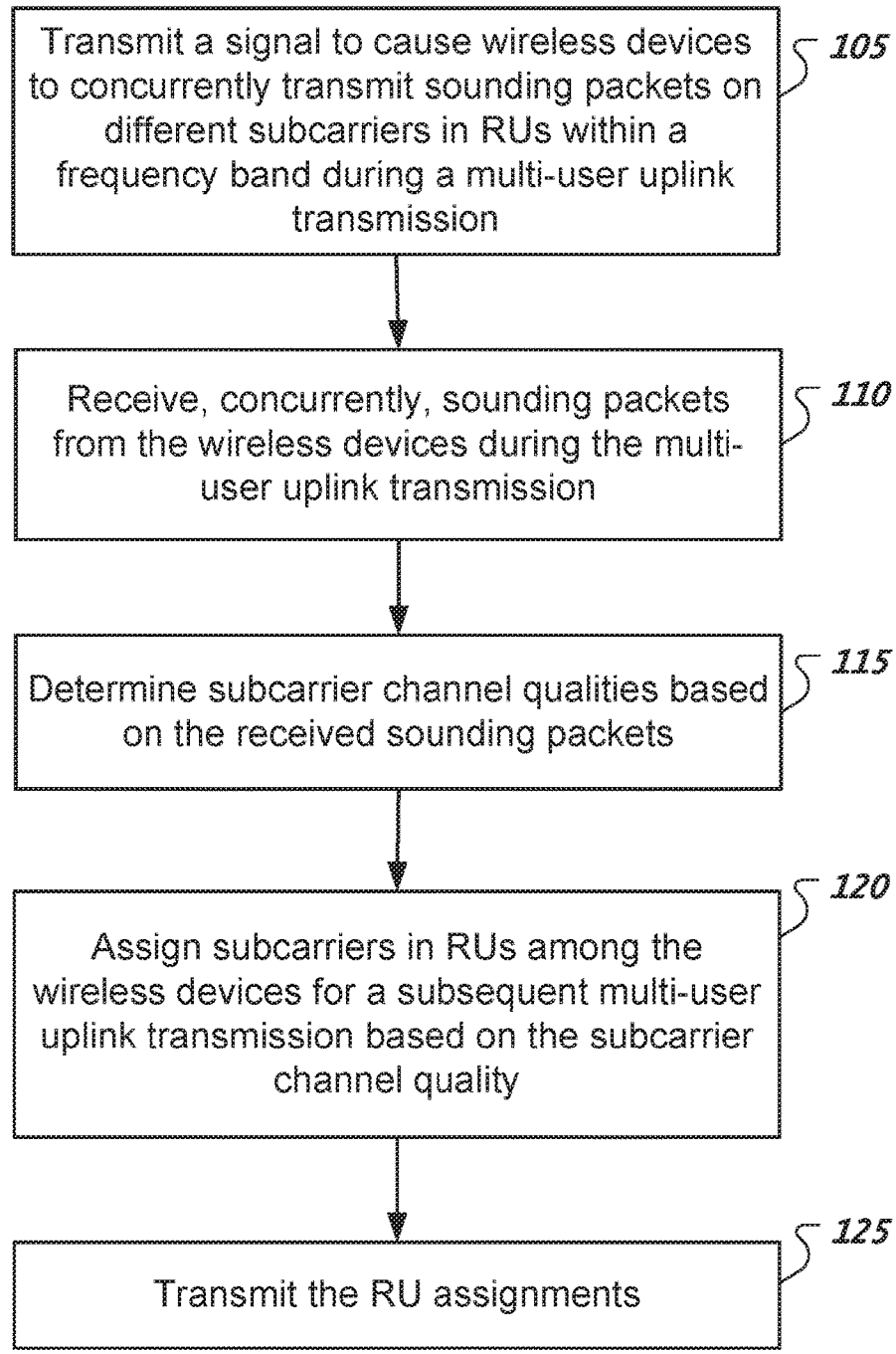
FIG. 1 shows a flowchart of an example of a multi-user sounding process.

FIG. 1 shows a flowchart of an example of a multi-user sounding process. Unlike SU sounding, the multi-user (MU) sounding process causes sounding of all devices within a select group to occur concurrently. At 105, the process transmits a signal to cause wireless devices to concurrently transmit sounding packets on different subcarriers in RUs within a frequency band during a multi-user uplink transmission. A multi-user uplink transmission can include a multi-user sounding transmission, a multi-user data transmission, or both. In some implementations, the multi-user uplink transmission is a multi-user uplink sounding transmission; see, for example, the description below in connection with FIG. 3. In some implementations, the multi-user uplink transmission contains sounding packets that are piggybacked after protocol data unit packets such as PPDUs; see, for example, the description below in connection with FIGS. 6 and 7. In some implementations, subcarrier assignments for the sounding packets are interleaved. In some implementations, subcarrier assignments for the sounding packets represent different continuous portions of a frequency band.

In some implementations, transmitting a signal at 105 includes transmitting a trigger such as a multi-user NDPA or PPDU trigger. A PPDU trigger causes the devices to transmit PPDUs via uplink OFDMA. In some implementations, sounding packets are piggybacked to protocol data units such as PPDUs. In some implementations, the trigger includes a group address to cause devices associated with the group address to perform multi-user sounding. In some implementations, the frequency band is a 20 MHz, 40 MHz, 80 MHz, 160 MHz, or 80+80 MHz channel. While the device's uplink transmissions within the multi-user transmission may have different start times (e.g., synchronization among the wireless devices may not be perfect), there is nonetheless overlap among the uplink transmissions, and so the transmissions are deemed concurrent transmissions.

At 110, the process receives, concurrently, sounding packets from the wireless devices during the multi-user uplink transmission. In some implementations, the sounding packets are received after PPDUs within the multi-user uplink transmission. At 115, the process determines subcarrier channel qualities based on the received sounding packets. In some implementations, the sounding packets contain one or more well known sounding sequences. The process, for example, compares received sounding packets to their correspondingly well known sounding sequences to measure the extent of distortion, e.g., attenuation, caused by the subcarrier channels. In some implementations, the process determines subcarrier channel qualities on a subcarrier-by-subcarrier basis. In some implementations, the process determines a channel quality, in the aggregate, for a RU containing multiple subcarriers.

At 120, the process assigns subcarriers in RUs among the wireless devices for a subsequent multi-user uplink transmission based on the subcarrier channel qualities. In some implementations, the RUs are assigned to achieve the lowest possible attenuation for a group of client wireless devices. At 125, the process transmits the RU assignments. In some implementations, the RU assignments are transmitted within a trigger frame that triggers a subsequent multi-user uplink transmission.

Figure 2:
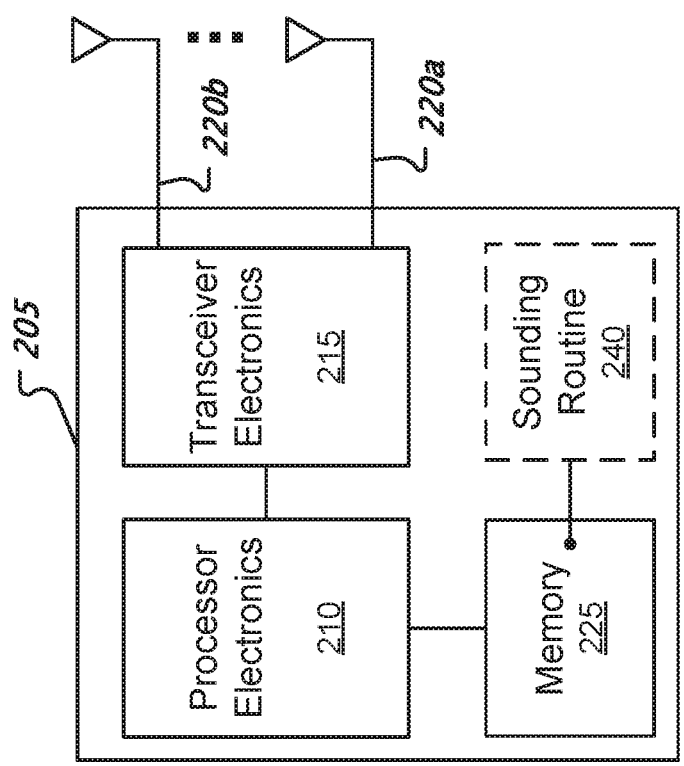
FIG. 2 shows a block diagram of a wireless device.

FIG. 2 shows a block diagram of a wireless device 205. The device 205 can include processor electronics 210 such as one or more processors that implement methods effecting the techniques presented in this disclosure. Various examples of device 205 include an AP or a client wireless device. An AP can also be referred to as a base station (BS). A client device can also be referred to as a STA or mobile station (MS). In some implementations, the device 205 can be operated as an AP or as a client depending on a configuration parameter. The device 205 can include transceiver electronics 215 to send and receive wireless signals over one or more antennas 220*a-b*. In some implementations, transceiver electronics 215 can include multiple radio units. In some implementations, a radio unit includes a baseband unit (BBU) and a radio frequency unit (RFU) to transmit and receive signals. In some implementations, the device 205 includes dedicated circuitry for transmitting and dedicated circuitry for receiving. The device 205 can include one or more memories 225 configured to store information such as data and/or instructions. For example, a memory 225 can store a sounding routine 240 that includes instructions to cause the device 205 to perform operations such as transmitting a sounding transmission, triggering sounding packets to be transmitted, or determining subcarrier channel qualities.

Figure 3:
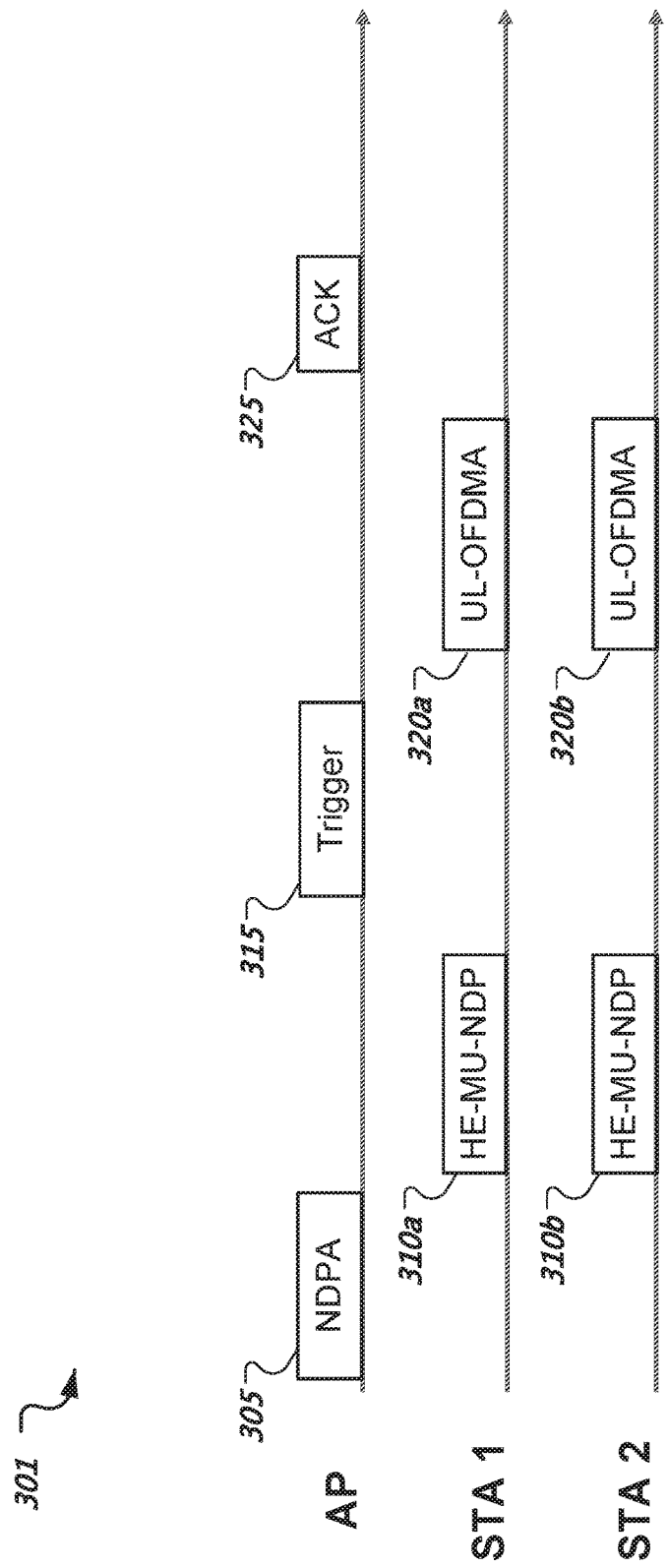
FIG. 3 shows a multi-user communication sequence among wireless devices.

FIG. 3 shows a multi-user communication sequence 301 among wireless devices. The communication sequence 301 includes a null data packet announcement (NDPA) 305; sounding packets including high-efficient multi-user null data packets (HE-MU-NDPs) 310*a*, 310*b*; trigger 315; UL OFDMA transmissions 320*a*, 320*b*; and acknowledgement 325. An AP can initiate a multi-user sounding procedure for client wireless devices in a to-be-scheduled set for UL OFDMA transmissions 320*a*, 320*b*. In this example, the AP transmits a trigger such as a NDPA 305 that will solicit each client wireless device to send NDPs 310*a-b* on RUs assigned by the AP, which can be indicated by the NDPA 305. The RUs for the different client wireless devices do not overlap and can be assigned in an interleaved or a continuous fashion. The NDPs 310*a-b* can be transmitted in a high efficiency multi-user format. The AP can assign to a client wireless device one or more RUs that are sounded or partially sounded. For example, the AP can aggregate sounding data collected from multiple partial soundings of smaller RUs to construct a sounding result for a larger RU.

To schedule UL OFDMA transmissions 320*a-b*, the AP transmits a downlink trigger 315 to signal uplink resource allocations to the client devices. The client devices perform UL OFDMA transmissions 320*a-b* in accordance with the resource allocations. The UL OFDMA transmissions 320*a-b* can respectively include PPDUs. If the AP successfully receives the UL-OFDMA transmissions 320*a-b*, the AP sends an acknowledgement 325. In some implementations, the acknowledgement 325 individually identifies which of the PPDUs in the UL OFDMA transmissions 320*a-b* were successfully received.

In some implementations, RUs assigned for sounding packets such as NDPs 310*a-b* can be non-continuous. In some implementations, a RU for a client's sounding packet has the size of Nx26-tone and occupy every K-th 26-tone within a frequency band, where N and K are integers equal to or greater than 1, where 26-tone denotes a continuous group of 26 subcarriers, K is equal to the number of client wireless devices and N is based on the total number of 26-tones within the frequency band. Accordingly, the individual 26-tones from each client's sounding packet are interleaved within the frequency band. In a two client example, a first client is assigned the beginning 26-tone chunk of a frequency band, a second client is assigned the next 26-tone chunk, the first client is assigned the next 26-tone chunk of a frequency band, the second client is assigned the next 26-tone chunk, and so on.

In some implementations, RUs assigned for sounding packets such as NDPs 310*a-b* can be continuous and non-interleaved. For example, an assigned RU can span a continuous portion of subcarriers within a frequency band. In some implementations, the RU size for each client wireless device can be different based on the client's buffer report and other information such as the overall number of available subcarriers. In some implementations, an AP can assign different RUs for a single client wireless device in different sounding solicitations; and over multiple solicitations, the AP can determine the quality of multiple RUs for the client wireless device.

Figure 4:
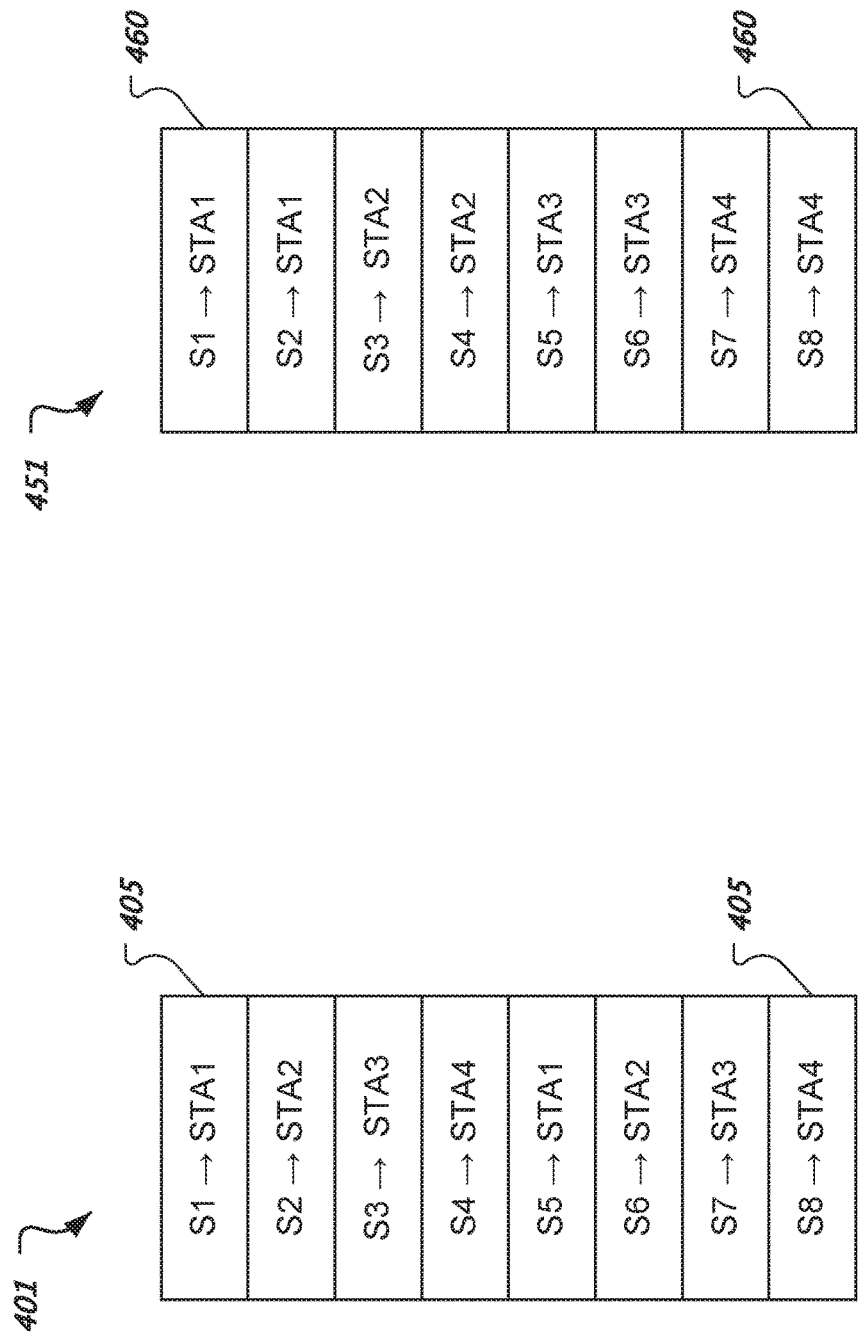
FIGS. 4A and 4B show examples of resource unit assignments within a frequency band for an uplink multi-user transmission.

FIGS. 4A and 4B show examples of resource unit assignments within a frequency band for an uplink multi-user transmission. In these example, the client wireless devices transmit packets such as a PPDU, NDP, or both, on assigned RUs. In some implementations, a RU assignment can specify one or more subcarriers assigned to a client wireless device for use in an UL OFDMA transmission.

FIG. 4A shows an example of a uplink multi-user transmission 401 that has interleaved assignments of subcarriers 405 (labelled S1 to S8) among a group of wireless devices (labelled STA1, STA2, STA3, and STA4). The transmissions on the subcarriers 405 can form OFDMA transmissions. In this example, adjacent subcarriers 405 are assigned to different wireless devices. In some implementations, a device's assigned subcarriers 405 can span, e.g., be scattered uniformly throughout, the entire frequency band associated with the uplink multi-user transmission 401. During the multi-user transmission 401, the wireless devices concurrently transmit signals that embody information such as a PPDU, NDP, or both in accordance with the interleaved subcarrier assignments. While the device's uplink transmissions within the multi-user transmission 401 may have different start times (e.g., synchronization among the wireless devices may not be perfect), there is nonetheless overlap among the uplink transmissions, and so the transmissions are deemed concurrent transmissions.

FIG. 4B shows an example of a uplink multi-user transmission 451 that has consecutive assignments of subcarriers 460 (labelled S1 to S8) among a group of wireless devices (labelled STA1, STA2, STA3, and STA4). The transmissions on the subcarriers 460 can form OFDMA transmissions. In this example, a first group of consecutive subcarriers 460 (S1 and S2) are assigned to a first device (STA1), a second group of consecutive subcarriers 460 (S3 and S4) are assigned to a second device (STA2), etc. During the multi-user transmission 451, the wireless devices concurrently transmit signals that embody information such as a PPDU, NDP, or both in accordance with the consecutive subcarrier assignments. In some implementations, a mixture of interleaving and consecutive subcarrier assignments can be used, e.g., interleaving two or more consecutive subcarriers.

Figure 5:
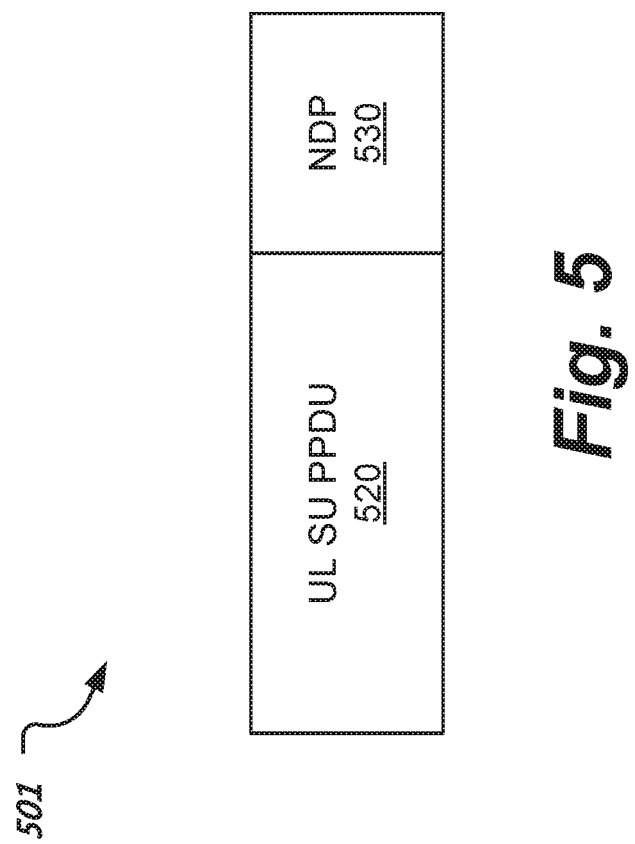
FIG. 5 shows a single-user uplink transmission of an example of piggybacking a sounding packet to a protocol data unit.

FIG. 5 shows a single-user uplink transmission 501 of an example of piggybacking sounding packet to a protocol data unit. The uplink transmission 501 includes a protocol data unit such as an UL SU PPDU 520 and a sounding packet such as a NDP 530. In this example, a client wireless device can proactively piggyback the NDP 530 to the SU PPDU 520 without the AP soliciting the sounding. In some implementations, the piggybacked NDP 530 includes one or more preambles. In some implementations, a piggybacked NDP 530 includes two or more long training fields (LTFs) such as high-efficiency (HE) LTFs (HE-LTFs). In some implementations, the piggybacked NDP 530 includes one or more long training symbols such as HE-LTFs after one or more short training fields (STFs) such as HE-STFs. In some implementations, the piggybacked NDP 530 includes one or more training symbols whose dimension, e.g., number of training symbols, may be different from the number of training symbols in the PPDU 520. Examples of LTFs, STFs, and versions thereof are provided by the IEEE 802.11 family of standards. However, other types of training fields are possible.

FIG. 6 shows a multi-user communication sequence 601 among wireless devices that includes sounding packets piggybacking on protocol data units. The sequence 601 includes a trigger 610; PPDUs 620*a*, 620*b*, 620*c*, 620*d*; sounding packets 630*a*, 630*b*, 630*c*, 630*d*; and acknowledgement 640. The access point transmits a downlink trigger 610 to start a multi-user uplink transmission from a group of client wireless devices (labelled STA1, STA2, STA3, and STA4). During the multi-user uplink transmission, the group of client wireless devices transmit respective PPDUs 620*a-d* and subsequently transmit respective sounding packets 630*a-d*. The concurrent transmissions from the devices collectively form OFDMA transmissions. Based on successful reception of the PPDUs 620*a-d*, the access point transmits an acknowledgement 640.

In some implementations, the trigger 610 includes one or more resource unit allocations that indicates subcarrier-to-device assignments for the PPDUs 620*a-d*. In some implementations, the trigger 610 includes one or more resource unit allocations that indicates subcarrier-to-device assignments for the PPDUs 620*a-d* and subcarrier-to-device assignments for the sounding packets 630*a-d*. In this example, the subcarrier-to-device assignments for the PPPUs 620*a-d* are different from the subcarrier-to-device assignments for the sounding packets 630*a-d*. As depicted, the assignments alternate. For example, a wireless device uses a group of one or more subcarriers to transmit a PPDU 620a, and uses a different group of one or more subcarriers to transmit a sounding packet 630a. In some implementations, each of the PPDUs 620a-d includes training fields and each of the sounding packets 630a-d includes training fields. In some implementations, the length of the sounding packet training fields can be greater than the length of PPDU training fields.

Figure 7:
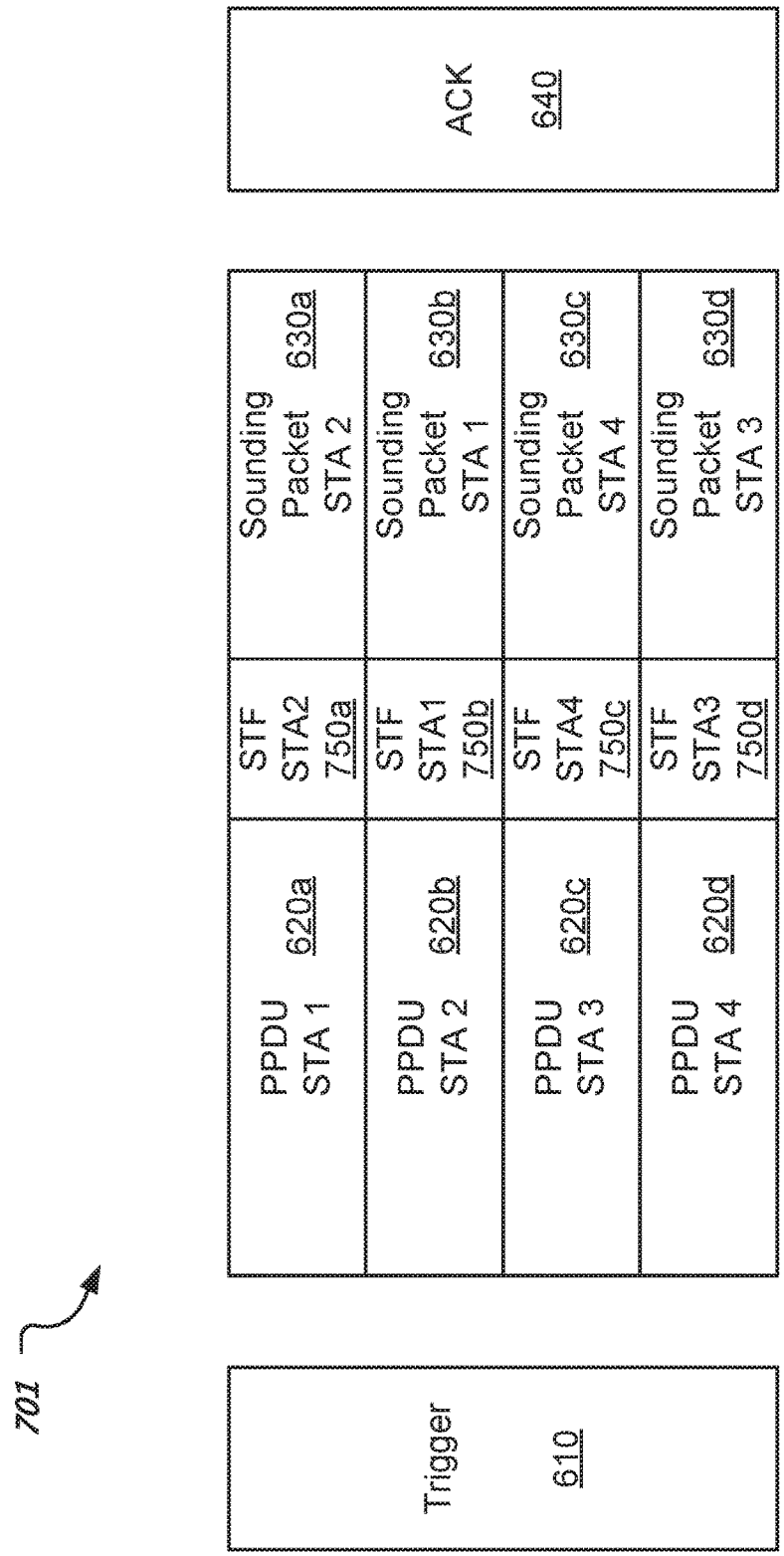
FIG. 7 shows a communication sequence that is a variant of the sequence shown in FIG. 6 where short training fields are transmitted between protocol data units and sounding packets.

FIG. 7 shows a communication sequence 701 that is a variant of the sequence shown in FIG. 6 where short training fields are transmitted between protocol data units and sounding packets. The sequence 701 includes a trigger 610; PPDUs 620a-d; sounding packets 630a-d; and acknowledgement 640. In this example, the sequence 701 further includes short training fields (STFs) 750a, 750b, 750c, and 750d between the PPDUs 620a-d and the sounding packets 630a-d. The subcarrier assignments for the short training fields 750a-d are the same as the subcarrier assignments for the sounding packets 630a-d. The short training fields 750a-d can provide temporal separation between the PPDUs 620a-d and the sounding packets 630a-d. Further, short training fields 750a-d can help the receiver, e.g., an access point, to settle an automatic gain control process before receiving the sounding packets 630a-d.

Figure 8:
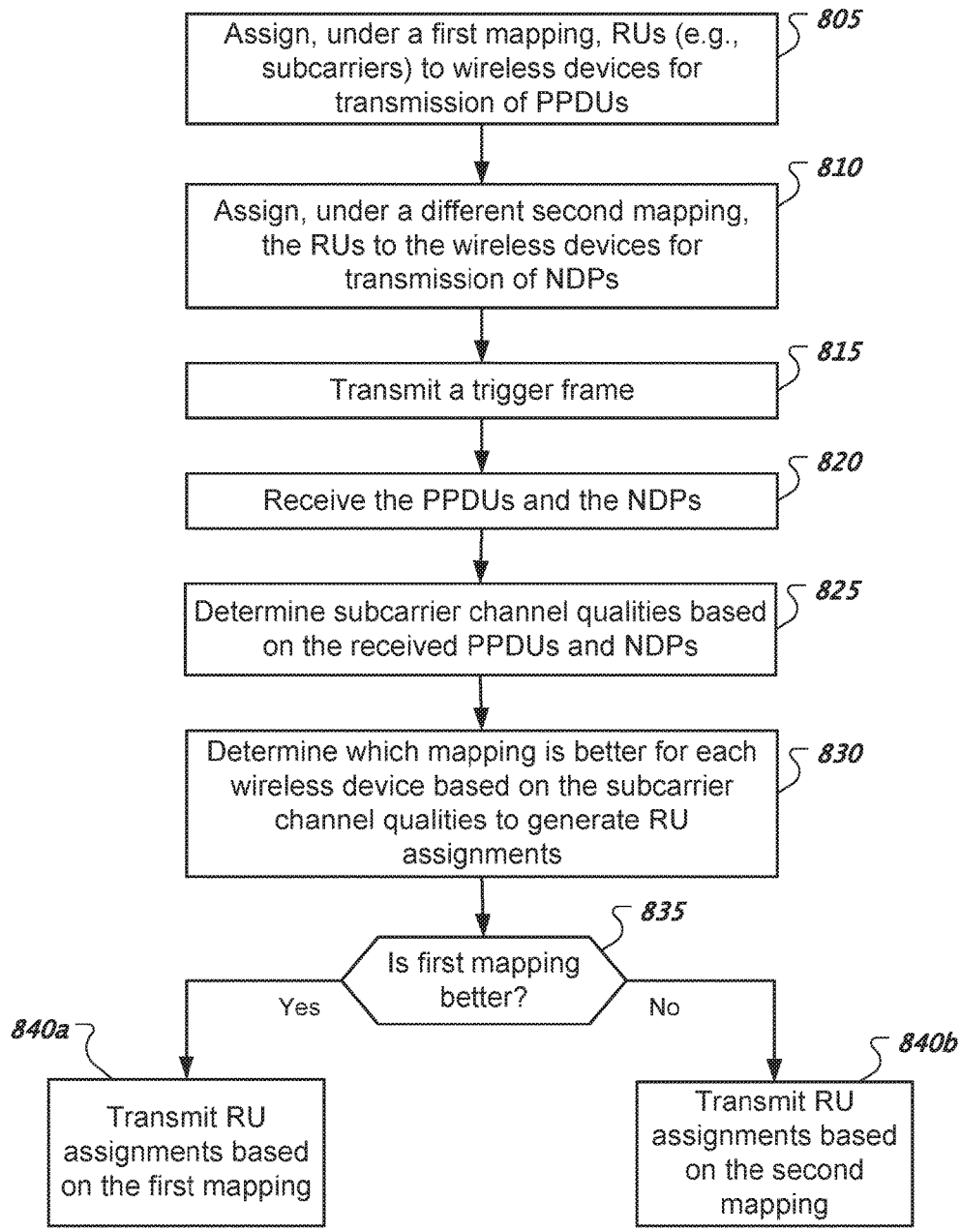
FIG. 8 shows a flowchart of an example of a sounding process that includes piggybacking protocol data units and sounding packets in the uplink direction.

FIG. 8 shows a flowchart of an example of a sounding process that includes piggybacking protocol data units and sounding packets in the uplink direction. At 805, the process assigns, under a first mapping, RUs to wireless devices for transmission of PPDUs. Assigning a RU can include assigning one or more subcarriers. In some implementations, the process can assign RUs based on how much data a client device needs to transmit, quality of service, and other factors. In some implementations, the process can assign RUs based on one or more previous sounding procedures. In some implementations, the process can determine a number of client devices that are to be scheduled together in an OFDMA transmission, partition the available subcarriers based on the number of devices, and assign subcarriers accordingly. In some implementations, the subcarriers are assigned in non-continuous blocks. In some implementations, the subcarriers are assigned in continuous blocks.

At 810, the process assigns, under a different second mapping, the RUs to the wireless devices for transmission of NDPs. While similar to the assignment process at 805, the process uses a second mapping that is different from the first mapping. The first and second mappings alternate subcarrier assignments. For example, in some implementations, the difference between the first and second mappings is that a subcarrier cannot be allocated to the same device for both mappings. This allows a client device to test one RU assignment for the PPDU and a different RU assignment for its NDP so that the AP can determine which is a better assignment. Note that, in some implementations, there can be some overlap in assignments between the first and second mappings to address certain situations, e.g., if there is an odd number of client devices.

At 815, the process transmits a trigger frame. In some implementations, the trigger frame includes both of the assignments from 805 and 810. In some implementations, the trigger frame includes the assignments from only 805, with the client device being able to derive the assignments from 810 based on a predetermined set of rules. In some implementations, the trigger frame includes an indication to start an UL OFDMA transmission and an indication that the client devices are to piggyback sounding packets onto the PPDUs.

At 820, the process receives the PPDUs and the NDPs. The process receives the PPDUs concurrently due to the nature of OFDMA communications, and likewise receives the NDPs concurrently. In some implementations, the process receives STFs between the PPDUs and NDPs, and performs automatic gain control (AGC) during the STF reception time. At 825, the process determines subcarrier channel qualities based on the received PPDUs and NDPs. In some implementations, the process determines channel qualities at the aggregate RU level. In some implementations, the process determines subcarrier channel qualities for the PPDU transmissions based on training symbols within the PPDU transmissions. In some implementations, the process determines subcarrier channel qualities based on a bit error rate (BER) for the PPDU transmissions. Other error measures are possible. In some implementations, the process determines subcarrier channel qualities based on comparing the received NDPs to reference NDPs to determine a degree of attenuation for each subcarrier.

At 830, the process determines which mapping is better for each wireless device based on the subcarrier channel qualities to generate RU assignments. For example, if the j-th device used the i-th RU for its PPDU and the (i+1)-th RU for its NDP, the process can determine which of the i-th RU or (i+1)-th RU is better for the j-th device. However, if the same RU is the better selection for two devices, the process can break the tie by examining the alternate RUs of these two devices to prevent an assignment to the worst alternate. In general, the process can make assignments to promote the best, or at a better, overall performance for a group of devices.

If at 835, the first mapping is better, the process, at 840a transmits RU assignments based on the first mapping. If at 835, the second mapping is better, the process, at 840b, transmits RU assignments based on the second mapping. In some implementations, the process creates a third mapping that is different from the first and second mappings to generate RU assignments. These RU assignments can be transmitted in a trigger frame. In some implementations, the process includes using subcarrier channel qualities that are determined based on the received protocol data units and subcarrier channel qualities that are determined based on the received sounding packets to determine whether a subcarrier assignment under the first mapping for a wireless device is better or worse than a subcarrier assignment under the second mapping for the wireless device.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A method comprising:
   transmitting a signal to cause wireless devices to concurrently transmit sounding packets on different subcarriers within a frequency band during a multi-user uplink transmission;
   receiving, concurrently, sounding packets from the wireless devices on the different subcarriers within the frequency band during the multi-user uplink transmission,
   wherein transmitting the signal comprises transmitting a trigger frame to cause the wireless devices to respectively transmit protocol data units before the sounding packets, and
   wherein the multi-user uplink transmission comprises the protocol data units and the sounding packets;
   determining subcarrier channel qualities based on the sounding packets;
   assigning the subcarriers among the wireless devices for a subsequent multi-user uplink transmission based on the subcarrier channel qualities,
   assigning, under a first mapping, the subcarriers to the wireless devices for transmission of the protocol data units;
   assigning, under a second mapping, the subcarriers to the wireless devices for transmission of the sounding packets, wherein the first mapping and the second mapping alternate subcarrier to device assignments;
   receiving the protocol data units; and
   determining second subcarrier channel qualities based on the protocol data units; and
   using (i) the second subcarrier channel qualities that are determined based on the protocol data units and (ii) first subcarrier channel qualities that are determined based on the sounding packets to determine whether a subcarrier assignment under the first mapping for a wireless device of the wireless devices is better or worse than a subcarrier assignment under the second mapping for the wireless device of the wireless devices.

2. The method of claim 1, wherein one or more short training fields are transmitted between the protocol data units and the sounding packets, and wherein the sounding packets comprise long training fields.

3. The method of claim 1, wherein transmitting the signal comprises transmitting a null data packet announcement frame, and wherein the multi-user uplink transmission comprises a multi-user uplink sounding transmission.

4. The method of claim 1, comprising:
   assigning a first group of the subcarriers to a first wireless device of the wireless devices; and
   assigning a second group of the subcarriers to a second wireless device of the wireless devices, wherein transmitting the signal comprises transmitting subcarrier assignment information about the first group of the subcarriers and the second group of the subcarriers.

5. The method of claim 4, wherein the first group of the subcarriers is interleaved with the second group of the subcarriers across the frequency band.

6. The method of claim 4, wherein the first group of the subcarriers is continuous within the frequency band, and the second group of the subcarriers is continuous within the frequency band.

7. An apparatus comprising:
   a transceiver configured to (i) transmit a signal to cause wireless devices to concurrently transmit sounding packets on different subcarriers within a frequency band during a multi-user uplink transmission and (ii) to receive, concurrently, sounding packets from the wireless devices on the different subcarriers within the frequency band during the multi-user uplink transmission,
   wherein the signal comprises a trigger frame to cause the wireless devices to respectively transmit protocol data units before the sounding packets, and
   wherein the multi-user uplink transmission comprises the protocol data units and the sounding packets; and
   a processor coupled with the transceiver, wherein the processor is configured to (i) determine subcarrier channel qualities based on the sounding packets and (ii) assign the subcarriers among the wireless devices for a subsequent multi-user uplink transmission based on the subcarrier channel qualities,
   wherein the processor is configured to:
   assign, under a first mapping, the subcarriers to the wireless devices for transmission of the protocol data units, and
   assign, under a second mapping, the subcarriers to the wireless devices for transmission of the sounding packets, wherein the first mapping and the second mapping alternate subcarrier to device assignments;
determine second subcarrier channel qualities based on the protocol data units; and
use the second subcarrier channel qualities that are determined based on the protocol data units and first subcarrier channel qualities that are determined based on the sounding packets to determine whether a subcarrier assignment under the first mapping for a wireless device of the wireless devices is better or worse than a subcarrier assignment under the second mapping for the wireless device of the wireless devices.

8. The apparatus of claim 7, wherein one or more short training fields are transmitted between the protocol data units and the sounding packets, and wherein the sounding packets comprise long training fields.

9. The apparatus of claim 7, wherein the signal comprises a null data packet announcement frame, and wherein the multi-user uplink transmission comprises a multi-user uplink sounding transmission.

10. The apparatus of claim 7, wherein the processor is configured to:
assign a first group of the subcarriers to a first wireless device of the wireless devices, and
assign a second group of the subcarriers to a second wireless device of the wireless devices, wherein the signal comprises subcarrier assignment information about the first group of the subcarriers and the second group of the subcarriers.

11. The apparatus of claim 10, wherein the first group of the subcarriers is interleaved with the second group of the subcarriers across the frequency band.

12. The apparatus of claim 10, wherein the first group of the subcarriers is continuous within the frequency band, and the second group of the subcarriers is continuous within the frequency band.

* * * * *